Oct. 1, 1929.  H. H. WELCH  1,730,257
COMPOSITE GEM
Filed Nov. 22, 1924

INVENTOR
Horace H. Welch.
BY
ATTORNEY

Patented Oct. 1, 1929

1,730,257

UNITED STATES PATENT OFFICE

HORACE H. WELCH, OF NEW YORK, N. Y.

COMPOSITE GEM

Application filed November 22, 1924. Serial No. 751,423.

This invention relates to improvements in composite gems of the type of my prior Patent 1,421,329, granted to me 27 June, 1922, and of my application Serial No. 733,472, filed 22 August, 1924, showing a composite gem substantially like that herein disclosed save for the improvements recited in the claims hereof. The invention also can be employed in connection with the composite gem of my application, S. N. 71,312, filed 28 November, 1925, as a division of the above application.

The object of the invention is to improve the appearance and enhance the beauty of gems of my composite type.

The invention resides principally in the provision of transparent spacing means between the several units of the group of small gems. Incidentally, the invention results in a decrease of cost of my composite gem.

The principal features of the invention are shown in Figs. 7-9, the remaining figures illustrating the steps in manufacture which are disclosed for the purpose of guiding the constructor in making the composite gem to include the present invention.

Figure 8:
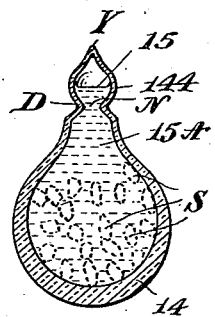
Figure 9:
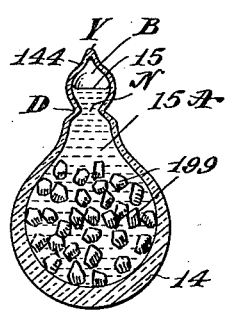

Fig. 8 is a vertical section showing in dotted lines the transparent solid parts S of the invention which are located in the liquid inside the gem housing, the visible solid parts being omitted here for clearness, although shown in Fig. 9; and Fig. 9 is a vertical section showing the visible solid parts or gems 199 in the liquid in the housing, the spaces S between such visible parts being intended to be shown more or less in correspondence with the location of the transparent and preferably invisible parts S indicated in Fig. 8.

While the invention here is illustrated as embodied in a pendant jewel (Figs. 6 and 7), yet the composite gem itself hereof may be embodied in other forms of jewelry, such as finger rings, etc.

In order to understand the nature of the principal invention hereof, first consider Figs. 8 and 9, and particularly the lower portion or gem housing 14 of each, wherein 14 is a more or less or quite transparent and preferably colorless hollow housing as of glass such as the well-known pyrex glass; and inside of housing 14 is a body 15A of preferably similar transparency and colorlessness but preferably one which is a liquid at ordinary temperatures, such as glycerine. As shown, housing 14 is preferably globular or of other configuration involving lens curvatures. Small fragments or pieces of gems 199, preferably opals, partially fill gem-housing 14 and are mobile in liquid 15A, the gems 199 being substantially large in number and constituting a group including some gems on the outside of the group and some inside of the group. The gems preferably are so loosely housed as to permit their mobility in liquid 15A. The value in general of the composite gem hereof, aside from its practical and durable construction, resides in the special and beautiful appearance of the small gems 199 in the group, due to the transparent spacing means such as the solid pieces S, preferably emphasized by the effect of the lens curvature of housing 14 to be described.

Gems 199 preferably are fracture fragments of opals, quite small in individual size but of considerable number in proportion to the volume of the interior space of gem-housing 14, such that substantially all or a large proportion of such space shall appear, especially when gems 199 are in motion (Fig. 7), to be substantially a unitary gem although exhibiting the interesting phenomenon of having apparently moving parts, whereas in fact it is an over-all solid body. The interior parts actually are mobile, although the impression on the observer may be only that of an illusion of motion. This composite gem may be as large as that shown, but usually is considerably smaller and corresponding generally with the sizes of gems usually employed in jewelry. The number of small gems 199 inside housing 14 may be, say, a hundred more or less, and their average diameter may be on eighth of an inch more or less. The other solids S may be advantageously of about the same size and mass, although preferably less in number.

As disclosed in my said prior application, when gems 199 are in motion, the liquid 15A separates them from one another, thereby exposing to view more reflecting surfaces of more of the small gems, resulting in enhancing the beauty of the composite gem as a whole.

I have found that the more widely the gems 199 are separated from one another (up to the limit of exposing to view maximum surfaces of a maximum number of small gems 199, including those located centrally in the gem-group and otherwise obscured by those lying outside of the center in the group) the more beautiful will be the appearance of the composite gem as a whole; this as distinguished from the greatly inferior appearance of a mere aggregation of gems 199 lying in fixed positons in a close compact mass and exposing to view only the reflecting surfaces of those of the small gems which lie on the outside of such compact group.

In the practice of the present invention, gems 199 do in fact lie in such fixed positions in a compact group (due to gravity) except when the individual small gems have been set in motion; and even when they are in motion, they are not very widely separated from one another even when loose in liquid, and they tend more or less rapidly to return to fixed positions in such a compact group unless the forces tending to keep them in motion are continued.

By the present invention, the gems 199 remain permanently in more or less separated positions even when not in motion, and when they are set in motion they are more widely separated from one another than heretofore. This result is obtained by means of the transparent and preferably invisible solid parts S indicated in dotted lines in Fig. 8.

For various reasons stated in my said prior application, I prefer to employ glycerine as the liquid 15A (particularly when the gems are opals) in which gems 199 are immersed as indicated in Fig. 9; and when glycerine is employed, then parts S (Fig. 8) preferably are of pyrex glass because that is both transparent and also possesses substantially the same refractive index as glycerine, so that pyrex pieces S become invisible when immersed in and wetted by glycerine. Preferably also, housing 14 is of pyrex glass, especially when liquid 15A is glycerine and parts S are of pyrex glass, so that all the elements of the composite gem save the small gems are transparent and colorless, and are substantially indistinguishable from one another, and their appearance as things separate from the small gems themselves is masked, the spacers S in practice being substantially invisible and indistinguishable from the small gems.

As soon as pyrex parts S (Fig. 8) are immersed and wetted by the glycerine, they disappear from sight, either completely as substantially according to weather conditions, and as long as they remain immersed they cannot be seen in the glycerine 15A in gem-housing 14 by ordinary observation. Thus, when the invisible parts S are intermingled with gems 199 in housing 14, they serve to space gems 199 permanently always at least a minimum distance apart from one another even when the gems are not in motion. This static condition of small gems 199 is indicated in Fig. 9, where, also, they are separated from one another by spaces (filled with invisible spacers S), which spaces correspond to solids S actually more or less filling such spaces but invisible in glycerine 15A of Fig. 9. And when gems 199 are set in motion in liquid 15A, (Fig. 7) their spacing from one another is greatly increased (due to both spacers S and portions of the liquid intervening between spacers S and gems 199), with the useful because beautiful effect resulting from increasing the number of reflecting gem surfaces which are exposed to view, as will be described later in connection with Fig. 7.

There may not be much, if any, difference in numbers respectively of the visible and invisible solids S and 199. A very good and preferred relation is that indicated somewhat diagrammatically in Figs. 8 and 9, where are shown in Fig. 8 twenty invisible solids S and in Fig. 9 thirty visible solids 199; that is, four invisible solids S to six of the visible solids 199, or by volume approximately forty per cent of invisible solids S to sixty per cent of visible solids 199. Also there may be an even greater number of parts S than parts 199; although in general it is best to have at least some excess of parts 199 over parts S. Any relation of numbers of S and 199 is very good up from, say, twenty-five per cent up toward fifty per cent of parts S in proportion to parts 199; although the use of even any of parts S is useful to a degree, because enhancing beauty to a degree, as will be described in connection with Fig. 7.

Figure 2:
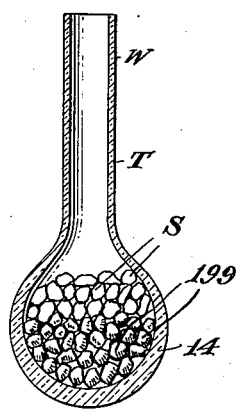
Fig. 2 is a vertical section like Fig. 1 but in addition showing in place, in the lower part of the housing, the solid interior parts of the composite gem.
Figure 3:
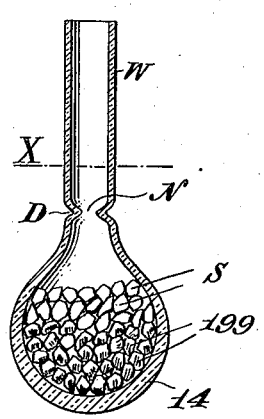
Fig. 3 is a vertical section like Figs. 1-2 but showing in addition the contraction of the neck of the housing preliminary to the formation of the smaller or bubble housing.

In the drawings which are sections (except Fig. 7) is shown only one vertical layer of solids S and 199. But of course the mixture of visible (199) and invisible (S) solids extends throughout the hollow globular interior of housing 14, save for the solid-free space filled only with liquid 15A, which space preferably is left in order to permit mobility of the small solid pieces in the liquid. The two kinds of solid pieces are placed in housing 14 (Fig. 2) prior to the insertion of liquid 15A and prior to the formation of the permanent housing as in Figs. 3–5. In Figs 2 and 3, the small glass pieces S are shown in full lines, because in that stage of the manufacture they are visible, i. e., prior to the insertion of glycerine 15A in housing 14, shown in Figs. 4–6 and 8–9, the liquid being present but not distinguishably visible in Fig. 7.

Preferably the display elements 199 and spacers S are not all of the same size and both preferably are graded in sizes from the largest to the smallest, the general order of size being as shown in the drawings in proportion to the rest of the structure. Thus ever after the initial intermingling of the various individual solids 199 and S of slightly differing sizes by motion in the liquid (Fig. 7), there will be a general tendency to the maintenance of a substantially uniform distribution of individual spacers S among and intermingled with the display elements 199, resulting in a substantially uniform diffusion of the latter. But in cases when the solid pieces are to have no motion in the liquid, the intermingling of 199 and S is effected carefully during manufacture for permanent effect.

Preferably, especially when gems 199 are opals, all the other elements are substantially colorless, including gem-housing 14, the liquid 15A and the spacers S. Thus the arrangement is adapted to give the best effect to the brilliant colors reflected from the surfaces of the opals 199, particularly under the additional conditions resulting from the present invention.

The principal utility of the present invention is the enhanced beauty of the composite gem, but a necessary incident of the presence of the fillers or spacers S is the saving in cost of gems 199 on account of the reduction of their number made possible by the employment of spacers S resulting in increased diffusion of the gems. Thus, instead of, say, one hundred gem fragments in the composite gem prior to the present invention, there will be, say, forty spacers S and only sixty small gems 199, and there will be a saving of forty per cent in gem cost. This permits either a reduced cost of the composite gem or else the use of much better gems or opals, such as selected opals which reflect most brilliant colors of greens, blues, pinks and reds.

The reason for the enhanced beauty provided by the present invention is not merely or necessarily that more opal surfaces are presented to view as the result of employing invisible spacers S. It may be, even with novel spacers S, that the aggregate opal surface exposed to view is no greater than heretofore. The point of value is that spacers S, whether or not gems 199 are in motion, permit the exposure to view of surfaces of those opal fragments which occupy positions in the interior of the gem group, which opals but for spacers S would be concealed from view by opals at the exterior portions of the group thereby intervening in the line of vision, and such increased gem visibility predominates over a low degree of visibility of the exterior outlines of the transparent spacers, which spacer-visibility may exist harmlessly in less superior forms of the invention. In this respect, the transparency of glass spacers S is of greater moment than their invisibility in liquid 15A, because a spacer S in effect is substituted for a usually opaque gem such as an opal, so that an opal behind such a spacer is visible through the transparent spacer. Thus the invention includes spacers which are transparent to a sufficient degree, even if they should be more or less visible in the liquid due to a combination of liquid and spacers which would not result in absolute invisibility of the spacers. However, the invisibility in liquid of the spacers S is valuable and preferable in that they then therefore can not possibly cause a diversion of attention from the observation of the brilliant reflecting surfaces of opals 199 (and particularly of mobile opals) in the central portions of the gem-group.

Figure 4:
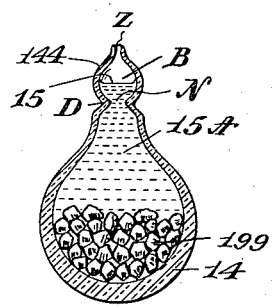
Fig. 4 is a vertical section of the lower part of Fig. 3, but showing liquid therein and also showing the result of drawing and breaking off the waste upper portion of the tube of Fig. 3.
Figure 7:
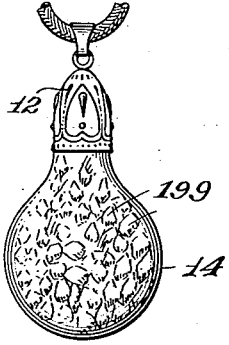
Fig. 7 is a view in elevation showing the complete assembly of Fig. 6, and indicating the effect of the invention in further increasing the volume occupied by the small gems when they have been set in motion in the liquid inside the gem housing.

Liquid 15A plays a part in the preferred forms of the invention in connection with spacers S, in that the liquid itself is a means which causes separation of gems 199 from one another when the gems are arranged to be mobile in the liquid; and when gems 199 initially are separated from one another by spacers S, and are mobile in the liquid, then the liquid serves to separate the gems from one another farther than if no liquid is employed. Thus, Fig. 7 indicates the conditions as viewed from outside the housing 14 (save for the colors reflected from gems 199) when the solids are in motion after having been initially spaced from one another by transparent solids S (Fig. 8), the result of the motion being to separate gems 199 yet further from one another. (Fig. 7 contrasted with Fig. 4.) This showing of Fig. 7 is to be contrasted also with that of Fig. 9, which is a section and shows only those of the gems which are in a single more or less vertical row or plane; whereas in Fig. 7 are shown all the surfaces of the gems 199 in various planes inside the housing 14 which are made visible by means of the gem spacing, due to both liquid 15A and solid spacers S when the solids are set in motion in the liquid.

The absence of liquid, and the presence of spacers S with gems 199, constitute a less preferred form of the invention, because spacers S even though transparent thereby would be caused to become more or less clearly visible; and gems 199, even if free to move in air or other gas, would not have the attractive slow mobility which the presence of the liquid permits them, particularly when the liquid is of such viscous character as glycerine.

Glass housing 14 also plays a very important part in the present invention in connection with spacers S, when it has substantially the curvature of the globular form shown; for such curvature constitutes a lens which, like a spotlight, concentrates the incident light at locations in the central portions of the interior of housing 14. Transparent spacers S expose to view the reflecting surfaces of opals occupying positions in such central portions of the housing, so that the eye of the observer by reflected light receives the full benefit of such lens concentration and magnification of light at the foci whereat the small opals may be located.

As disclosed in my said prior application, the glycerine serves to enhance the beauty of the reflections from the opal surfaces.

While it is greatly preferred, as the most beautiful form of the invention, to have the combined effect of mobility of opals 199 and also the vision of opal surfaces in the central portions of the housing space permitted by spacers S, yet the housing space may be filled completely with the mixture of solids S and 199, with or without, but preferably with, such a liquid 15A as glycerine filling the interstices between the immovable solids for the purpose of enhancing the color effect. If in such case no liquid 15A is used, the invention includes all forms of substantially transparent spacing means for gems 199, which may be sufficiently solid to maintain gems 199 in their positions so separated from one another.

The small gems or gem pieces or fragments 199 preferably are opals, because such gems permit the greatest advantage as to beauty to be taken of the invention; but other gems may be substituted for opals if and when desired.

Figs. 1-6 illustrate the method of manufacturing a composite gem embodying the present invention, in the form which is generally preferred for the general type of composite gem with which the invention is intended to be employed as an improvement.

Figure 1:
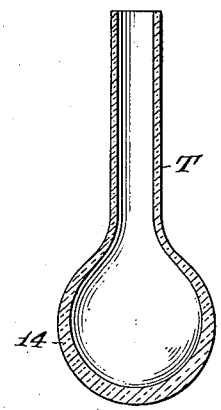
Figure 1 is a vertical section of a blank for the transparent housing of the composite gem.

In vertical section in Fig. 1 is shown a blank for the double globular housing 14—114 of Fig. 4 et seq. This blank is a transparent pyrex or even ordinary glass tube T with closed lower end blown or cast to form the globular gem housing 14 or any desired variation of such shape. The thickness of the wall of gem housing 14 may be three thirty-seconds of an inch more or less, i. e., sufficient to produce the desired strength for resistance to exterior impacts, thereby providing greater strength for the composite gem than ordinary opal gems which are fragile as well known. In fact, the jewel herein described may be flung around a room without injury to the gem.

As shown in Fig. 2, the small solids 199 and S next are dropped down into gem-housing 14 through the open top end of tube T. The upper portion W of this tube is to be wasted in process.

In Fig. 2, the opals 199 are shown in a compact group at the bottom of housing 14, and the pyrex glass spacers S are shown on top of them, the assumption being that these pieces have been dropped into the housing in that order of succession. But this is immaterial because later on, after the glycerine 15A has been placed in housing 14 and after the completed composite gem has been subjected to motion, the respective solids S and 199 will become intermingled to cause the desired substantially uniform spacing of gems 199. Spacers S are shown in full lines in Figs. 2 and 3 because they are there visible, the liquid of like refractive index not having yet been put in place in the housing.

Next, as shown in Fig. 3, tube T is heated around its circumference D at a location not far above the top level of the internal solid pieces S, such heating being continued until the glass of tube T is soft. Then such soft perifery of the tube is pinched inwardly to form small internal passage N (inside neck or shoulder D), such passage N being of the desired diameter to prevent passage of air bubble B (Fig. 4) to the interior of gem-housing 14 as disclosed in detail in my said co-pending application. Next, the tube T is heated at the higher circumference X (Fig. 3) and the waste portion W of the tube above perifery X is pulled out while the glass is soft at X and then broken off to form bubble-housing 144 (Fig. 4).

This pulling out of the upper end W of tube T (Fig. 3) results in a tube of small diameter and short length (not shown) which is broken off at Z (Fig. 4) to leave a small opening to permit filling the housing with liquid 15A. Then after the insertion of liquid 15A, housing 144 is sealed off, either at Y (Fig. 5) to close opening Z (Fig. 4) or at any other point.

Figure 5:
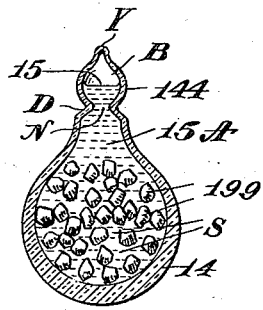
Fig. 5 is a section showing the result of sealing off the housing bulb and also illustrating the increased over-all space occupied by the group of gems 199 due to the present invention.
Figure 6:
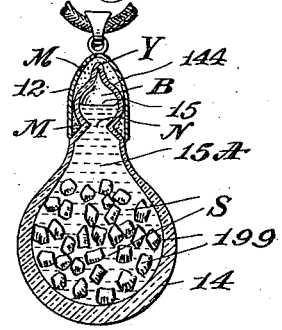
Fig. 6 is a vertical section showing the result of affixing a suitable jewel setting to the bubble housing of the completed composite gem of Fig. 5.

Glycerine 15A is filled, say, up to level 15 (Figs. 4 and 5), or otherwise, so that air space B will exist to permit expansion of the liquid without injury to the glass housing; this bubble being located in small upper housing 14 where it can be concealed by jewel setting 12 of Fig. 6, and the bubble B being retained in upper housing 144 by reason of the constricted portion of the main housing at N. The glycerine is substantially transparent and colorless, and is viscous to permit the desired slow movement of opals 199. The high refractive index of the glycerine serves to bring out, emphasize and make more brilliant the colors reflected from the opal surfaces. Other liquids may be used, however, such as an aqueous solution of borotungstate of cadmium; preferably with transparent spacers S having substantially the same refractive index. In the figures beginning with Fig. 4, wherein glycerine 15A is present, the pyrex glass spacers S are no longer visible, because the glycerine has wetted them; and for this reason they are not shown in any of the remaining figures save in dotted lines in Fig. 8, and by their letter S (Figs. 5-6) leading to spaces between gems 199, which spaces are occupied by the invisible spacers. In Figs. 3-4 the locations of parts S and 199 indicate lack of movements as yet resulting in intermingling; gems 199 yet lying in a compact group at the bottom as in Fig. 2.

In Fig. 5, the operation of sealing-off has been accompanied by various movements of the composite gem as a whole, and these have caused the intermingling of invisible spacers S (shown in Figs. 2-3 as on top of opals 199) with the small opals 199, so that, as shown in Fig. 5, although gems 199 are shown as having reached a state of rest after their movements commingling them with spacers S, yet the over-all volume of the gem group as a stationary group has been increased by the spacing apart of the individual gems by the intermingling therewith of spacers S. As is shown by a comparison of Figs. 2 and 5, there has not been any actual increase of the volume occupied by the static group of both kinds of solids S and 199; but in Fig. 5 the volume occupied by the visible and spaced-apart static gems 199 is greater than that occupied by the same gems when, as shown in Figs. 2 and 3, they are not spaced apart by solids S. This increase in over-all volume occupied by gems 199, when separated by spacers S, and even when gems 199 are static, is shown most clearly by a comparison of Figs. 4 and 5. And this larger volume of Fig. 5 occupied by the gem group is further increased by liquid separation of gems 199, as indicated in Fig. 7, when the solids are set in motion and before they may have settled to the static condition of Figs. 5 and 6. Thus the provision of transparent spacing means S materially assists, with the large number of gems 199, in creating the impression of a unitary composite gem, notwithstanding the fact, as shown in Figs 2 and 3, that small gems 199 themselves may not occupy the greater proportion of the space inside housing 14, a considerable proportion of that space being occupied by liquid 15A (Fig. 4) in order to permit mobility of gems 199, and another considerable proportion of that space being occupied by spacers S (Figs. 2, 3 and 8). For even when gems 199 are at rest, as in Fig. 5, the presence of spacers S increases the over-all volume occupied by the visible gems 199; and when gems 199 are in motion as indicated by the condition shown in Fig. 7, this over-all volume of the gem group is yet further increased so as to reduce to a minimum any impression of a portion of housing 14 not occupied by small gems and therefore contrasting with the portion thereof occupied by the gem-group. In Figs 2 and 7 is shown the fact that the small gems 199 are sufficient in number to fill housing 14 from side to side and extend a substantial distance in the direction of gravity therein, (vertically in a pendant jewel) so as to cause the visual impression of substantially a unitary gem so far as is possible in view of the fact that part of the housing space is filled with liquid alone in order to permit mobility of gems 199. In Fig. 5, after invisible solids 15 have become intermingled with gems 199, the result of the increase in over-all volume occupied by the gems results in decreasing the wholly transparent parts of the housing seen as not occupied by the small gems. And, as shown in Fig. 7, where small gems have risen higher than in the static condition of Fig. 5, such wholly transparent portion of the composite gem at the upper portion of housing 14 is yet further reduced by the increase in volume occupied by the gems when in motion, and at such time separted from one another both by the liquid 15A and by the invisible spacers S, all with the result of reducing to the minimum any seeming departure from a unitary over-all composite gem.

Even when opals 199 are static as in Fig. 5, the invisible spacers S serve to enhance the beauty of the composite gem by exposing to view in the spots of incident light at the foci of the lenses of the curved portions of globular housing 14, the reflecting surfaces of opals in interior portions of the opal-group. This effect, with the opals static, is comparable with the effect when opals 199 are in motion but are separated only by the liquid in cases when the present invention (including spacers S) is lacking. And when opals 199 are in motion and then spaced apart by spacers S in addition to the liquid between moving small gems, as indicated in Fig. 7, then the effect is optimum, exposing to view additional opal surfaces at the foci of the lenses of the housing; because the initial spacing by solids S under static conditions is increased by the spacing of the liquid between solids 199 when the latter are further separated from one another as the result of their motion in the liquid.

Thus the invention is advantageous (in addition to the incidental economy of gem pieces), both in increasing the visual impression of a unitary over-all gem and in increasing the brilliancy of appearance by exposing to view more opal surfaces in the interior of the opal-group at the foci of the housing lenses.

The composite gem in the completed condition of Fig. 5 is ready to receive the setting 12 of Fig. 6, this setting being preferably of noble metal as gold, platinum or the like, and being secured to bubble housing 144 by jeweler's cement M, the setting thereby concealing sealing-off protuberance Y as well as the contrasting effect otherwise visible and due to the liquid level 15 in bubble housing 144.

The principal advantages of my composite real gem or opal, in addition to the advantages of spacers S above described, but particularly including the latter, are that it is a cheaper, stronger (less fragile) and more beautiful gem than a single unit of the same gem material of the same size as the composite gem.

Various terms in the claims, as "glass", "transparent", "opal" and "glycerine", etc., are used as limitations but are intended to include substantial equivalents in all cases of corresponding patentable novelty and utility; for example, some claims including the word "opal" may be patentable by virtue of such precise limitation, but the patentability of some claims using the word may be sufficient to warrant its construction to include other gem material. Various features of the invention may be employed without a liquid or in combination with features other than those disclosed herein.

The liquid 15A may be oil of cedar, in which case spacers S will be substantially invisible if made of ordinary glass.

I particularly point out and distinctly claim the part, improvement, or combination which I claim as my invention or discovery, as follows:—

1. The improvement in a composite gem of the type comprising a group of a multiplicity of small gems immersed and movable in a substantially transparent liquid in a substantially transparent housing wherein the liquid spaces apart the small gems when they are set in motion therein, said improvement consisting of a plurality of substantially transparent spacing pieces intermingled with the small gems and mobile in the liquid and having the property relative to the liquid which causes them to be substantially indistinguishable optically when in the liquid.

2. The improvement in a composite opal of the type comprising a group of a multiplicity of small opals immersed in glycerine in a substantially transparent housing, said improvement consisting of the mixture with the small opals of a plurality of substantially transparent small spacers.

3. The improvement in a composite gem of the type comprising a multiplicity of substantially opaque small gems arranged in substantially a globular group and sufficiently close together to give an appearance of continuity as of unitary gem, the improvement consisting of substantially transparent solid means located between adjacent individuals of the small gems in the group and substantially spacing them apart.

4. The method of improving the reflectivity of a composite opal of the type comprising a multiplicity of small opals immersed and mobile in a body of substantially transparent liquid in a substantially transparent housing, comprising interposing and intermixing with said small opals a substantial quantity of translucent particles having substantially the same index of refraction as the material of the housing, and introducing into the housing a liquid having a refractive index of the same order as that of the housing and the spacing particles.

HORACE H. WELCH.